May 5, 1959  E. K. DOMBECK  2,885,032

SELF-CENTERING BRAKE ASSEMBLY

Original Filed Oct. 17, 1951  2 Sheets-Sheet 1

INVENTOR.
EDWARD K. DOMBECK
BY
*G. A. Gust*
ATTORNEY

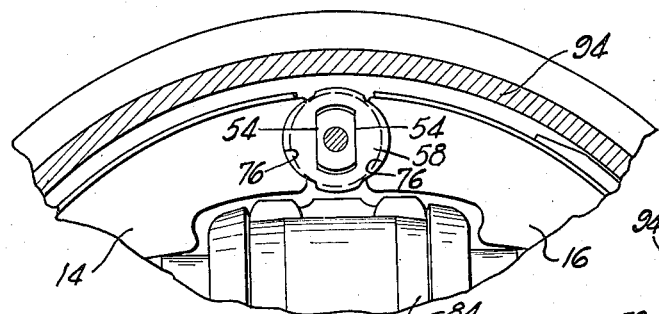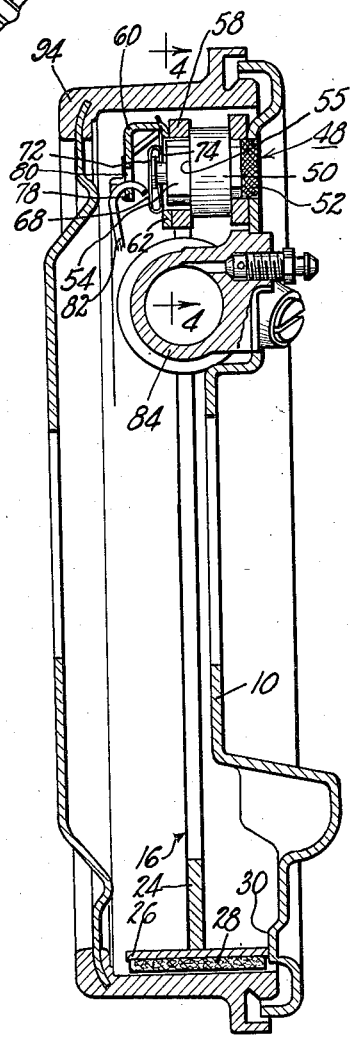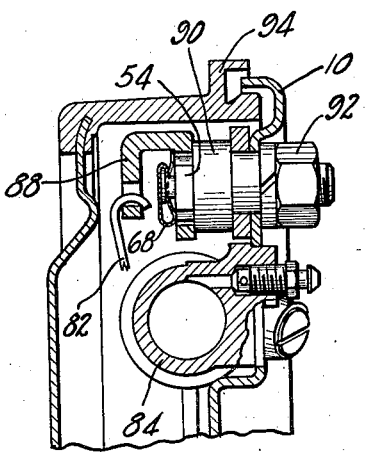

United States Patent Office 2,885,032
Patented May 5, 1959

2,885,032

SELF-CENTERING BRAKE ASSEMBLY

Edward K. Dombeck, South Bend, Ind., assignor to Bendix Aviation Corporation, South Bend, Ind., a corporation of Delaware Continuation of application Serial No. 251,723, October 17, 1951. This application March 14, 1956, Serial No. 571,410

16 Claims. (Cl. 188—79.5)

The present invention relates to a self-centering brake assembly for use with a rotatable drum and more particularly to an internally expanding brake assembly which incorporates novel means for maintaining the friction devices in the optimum operating position with respect to the drum. This is a continuation of application Serial No. 251,723, now abandoned.

The principal object of this invention is to provide a simple, efficient, economical, and reliable brake mechanism for use with a rotatable brake drum.

A further object of this invention is to provide a brake in which the shoe-to-drum clearance is simply and easily adjusted thereby enabling even an unskilled mechanic to make relatively quick and accurate adjustments.

Another object of this invention is to provide a brake mechanism which is automatically shiftable in accordance with drum distortion thereby reducing the probability that the brake shoes will drag, should the drum be distorted into engagement with the shoes.

Other objects will become apparent as the description proceeds.

In the drawings:

Figure 2 is a sectional view taken substantially on section line 2—2 of Figure 1;

Figure 4 is another partial section taken substantially on section line 4—4 of Figure 2;

Figure 5 is a fragmental section taken substantially on section line 5—5 of Figure 1; and Figure 6 is a fragmental section illustrating another embodiment of the present invention.

Figure 1:
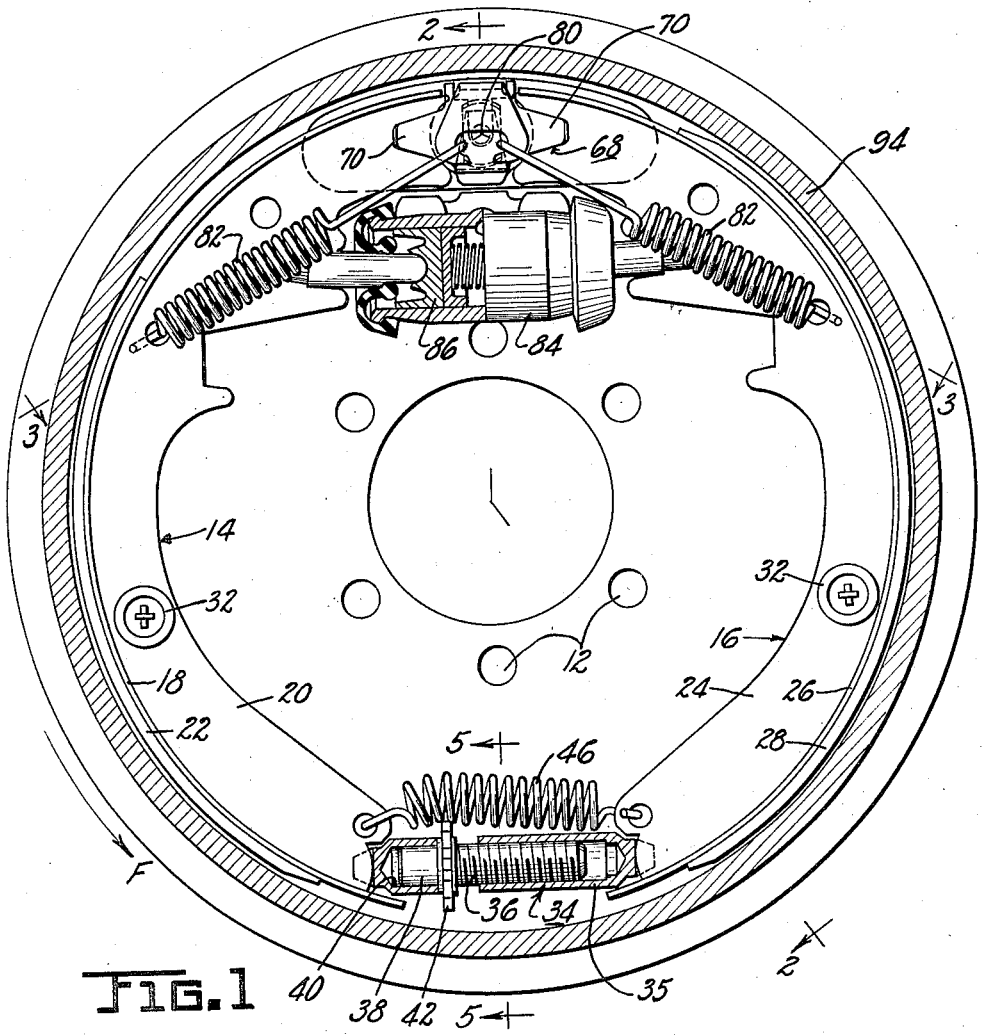
Figure 1 is a side elevation of an embodiment of the present invention.

Referring to the drawings, a backing plate or supporting member 10 formed of sheet metal to the desired configuration is provided with a plurality of circumferentially arranged bolt holes 12 by which the backing plate may be mounted on a suitable stationary part of a vehicle. A friction device is mounted on this backing plate 10 and comprises essentially a pair of T-section brake shoes 14 and 16. As illustrated in Figure 1, these shoes are circumferentially arranged in end-to-end relation, with shoe 14 consisting of an arcuate rim 18 suitably secured to a reinforcing web 20 and a composition lining segment 22 suitably secured to rim 18, and with shoe 16 being composed of identical parts; viz. a web 24, a rim 26, and a lining 28. The backing plate 10 is also provided with a number of circumferentially arranged, indented ledges 30 which are engaged by the rims of the shoes 14 and 16 for positioning said shoes laterally with respect to the backing plate 10. Suitable hold down devices 32 bias said shoes into engagement with the aforementioned ledges 30.

Again as viewed in Figure 1, the lower ends of shoes 14 and 16 are connected together by means of an adjustable thrust connection or adjuster generally indicated by the reference numeral 34. This adjuster is comprised of a nut 35 slotted at its right-hand end for embracing the end of the web 24. A screw 36 is received by nut 34 and is provided on its left-hand end with a spindle portion 38 which is received for rotation in a thrust socket 40 slotted at its left end for embracing engagement with the web 20 of shoe 14. The screw 36 is also provided with a toothed or star wheel 42 whereby rotation of this wheel will cause corresponding rotation of screw 36 and relative longitudinal movement between this screw 36 and the nut 35. Thus it is seen that by rotating wheel 42, the distance between the lower ends of shoes 14 and 16 may be varied.

An elongated slot 44 in backing plate 10 adjacent wheel 42 serves as a means by which a suitable tool, such as the blade of a screwdriver, may be used to rotate wheel 42 for adjusting the distance between the lower shoe ends. A coiled spring 46 is stretched between the lower ends of shoes 14 and 16 and across wheel 42 so as to retain said wheel in adjusted position and against accidental rotation. It may be mentioned here that by rotating wheel 42, an audible click is provided by the alternate engagement of the various wheel teeth with the spring 46. These clicks may be used as a gauge in determining the shoe-to-drum clearance.

Located between the other pair of adjacent shoe ends is an anchor assembly generally indicated by the reference numeral 48. This assembly is comprised of a rigid anchor post or support 50 suitably secured to the backing plate 10, and in the illustrated embodiment by means of a weld 52. As will be seen more clearly in Figures 1 and 2, anchor post 50 projects laterally outwardly beyond the plane of shoe webs 20 and 24. In the plane of these shoe webs, post 50 is provided on opposite sides thereof with two parallel flat surfaces 54 which extend substantially parallel to a radius of the braking mechanism and which terminate at the inner ends thereof in abutment shoulders 55.

It may be said at this point that it is not intended for anything stated herein to limit the particular angle of said flat surfaces with respect to a radius of the brake mechanism since it is a well known design principle that by varying the angles of said surfaces, different braking results may be achieved. Outwardly beyond the flat portion of post 50 is a head 56 which serves a purpose to be explained hereafter.

A hardened anchor bearing 58 which may be formed of sheet metal by a stamping operation, is preferably formed with a rounded outer periphery and a centrally located rectangular notch having a width substantially coincident with the distance between the two flat surfaces 54 on anchor post 50. This bearing 58 is received on flats 54, and as will be noted by reference to Figure 4, the length of the slot in bearing 58 is sufficient to allow for a slight movement of this bearing on the surfaces 54.

Referring to Figure 2, a U-shaped cross-section member 60 is next fitted into the assembly with one leg 62 thereof being placed against the left-hand face of bearing member 58. In order that the member 60 may move with bearing 58, the leg 62 is slotted similarly to that of bearing 58 and is provided with indentations 64 which receive suitable projections or nibs 66 extending from the faying surface of bearing 58.

A plate spring 68 is adapted to retain the anchor assembly 48 in assembled relation and as illustrated is compressed between the head 56 of post 50 and the leg 62 of member 60. This spring 68 has two oppositely extending arms 70 which engage the underside of head 56. Near the middle of said arms the leg 62 is engaged, and at the extreme outer ends said arms engage the webs 20 and 24, respectively, of shoes 14 and 16. The inner portions of these two arms 70 merge with another spring portion 72 bent around to overlie the outside of the head 56. As viewed in Figure 2, the upper end 74 of spring portion 72 is hooked over the enlarged portion of head 56 to positively locate the spring 68 in the anchor assembly 48. It is thus seen that spring 68 acts in such a manner as to force the member 60 and bearing 58 as a unit into contact with the abutment shoulders 55.

Figure 3:
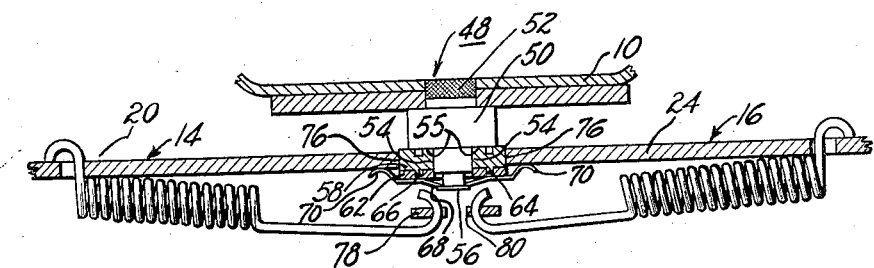
Figure 3 is a partial section taken substantially on section line 3—3 of Figure 1.

The ends of the webs 20 and 24 adjacent the anchor assembly 48 are formed with facing concave notches 76 which conform to the outer periphery of bearing 58 and which are engageable therewith. Thus it is seen, that as the bearing 58 is shifted radially of the brake mechansim, the upper ends of the two shoes 14 and 16 will be shifted accordingly. The other leg or connecting member 78 of member 60 lies adjacent but spaced from the outer end of post 50 and is provided with means for connecting return springs thereto. As shown in Figures 1 and 3, this means is an open slot 80 which provides two oppositely arranged hook portions engaged by respective hooks of the two return springs 82. The other ends of these return springs are connected respectively to the webs of shoes 14 and 16 so that in released condition, the brake shoes will always be urged into engagement with the anchor assembly 48.

The actuating means for this brake is a hydraulic cylinder 84 which is secured to the backing plate 10 by any suitable means, between the two upper ends of the shoes 14 and 16. This wheel cylinder 84 is of the conventional type and is provided with two oppositely movable pistons 86 having operative connections with the shoes 14 and 16 for expanding the upper ends thereof.

Referring now to Figure 6, a slight modification of the foregoing described embodiment is disclosed. This modification is substantially identical to the foregoing construction except in the respect that the member 60 and bearing 58 are combined into a single piece thereby reducing the total number of parts needed in the anchor assembly. It will be noted that this single piece 88 is of U-shaped cross section and is slidable on surfaces 54 of the post 90 the same as bearing 58 on the post 50. The only difference between the post 50 of the foregoing embodiment and the post 90 is the means by which this latter post is secured to the backing plate 10. In this latter instance, a nut 92 is used to secure post 90 in place. In other respects, this modification is the same as the first-described embodiment.

In operation, by injecting fluid pressure into wheel cylinder 84, the upper ends of the shoes 14 and 16 will be forced apart. Assuming that the rotation of drum 94 is in the direction of the arrow F, the moment the shoes contact the rotating drum, said shoes will be dragged around with the drum, and the drag force of shoe 14 will be transmitted through thrust link 34 to the lower end of shoe 16, and the shoe 16 will be forced into engagement with anchor bearing 58. In release of the brakes, the fluid pressure injected into the wheel cylinder 84 is relieved thereby allowing the return springs 82 to draw the shoe ends inwardly into engagement with the anchor assembly 48.

Heretofore, it has been the conventional practice to use a fixed type of anchor; that is, an anchor which is not movable radially of the brake during brake operation. In manufacturing a brake using this fixed anchor, it was necessary to provide some means for adjusting the anchor itself radially of the backing plate. The reason for this being that during manufacturing, dimensional tolerances would not allow the shoes to consistently assume the proper clearance relationship with the drum. Therefore, by providing a radial adjustment for the anchor post, the proper shoe-to-drum clearance could be initially set up by merely adjusting the anchor post in the proper position. As mentioned previously, the present invention does not use such an adjustable fixed anchor post, but conversely, uses a post which is securely welded against movement to the backing plate. Automatic positioning of the shoes of this invention is provided by the particular sliding anchor arrangement, thus eliminating the above-described initial anchor adjustment step in the manufacture of the brake.

The initial adjustment of the brake of this invention is achieved by merely rotating the toothed wheel 42 in a direction which will move the entire arcuate length of the linings 22 and 28 of shoes 14 and 16 into snug engagement with the drum 94. If prior to this adjustment, the upper ends of the shoes 14 and 16 are in their lowermost position with respect to anchor post 50, the adjusting procedure just described will force the upper shoe ends radially outwardly until the drum is engaged by the entire periphery of the linings on both shoes 14 and 16. This radial outward movement of the upper ends of the shoes is provided by the sliding contact of anchor bearing 58 on the flat surfaces 54 of anchor post 50. The next and final step in the adjusting procedure is to turn the wheel 42 in the opposite direction to disengage the linings from the drum by an amount which corresponds to the desired shoe-to-drum clearance. Thus it is seen, that by the simple expedient of rotating the adjuster wheel 42, the entire brake assembly may be accurately and quickly adjusted. As mentioned above, this simple adjustment procedure results in the complete elimination of anchor adjustment in the manufacture of the brake, thus conducing to a cost savings.

In operation, again assuming that drum 94 is rotating in the direction of arrow F, the anchor end of shoe 14 will leave the bearing 58 while the corresponding end of shoe 16 will firmly seat thereon. By following the actions of said shoes from the initial stages of actuation through to full brake application, it will be seen that the anchoring shoe will rotate about the periphery of bearing 58 until the aforementioned full brake application is attained. With each brake application, the bearing 58 is shifted upwardly to a position determined by the engagement of the shoes with the drum so that upon release of the brake, the anchored shoe merely pivots on the bearing in a direction away from the drum. As the brake lining wears, the shoes shift upwardly, thereby setting the bearing 58 in corresponding, newly adjusted positions. This shifting of bearing 58 and pivoting of the shoes results in automatic positioning of the shoes with respect to the drum for succeeding brake applications to compensate for lining wear and distortion of the drum.

When the brake linings have worn to the point where a manual adjustment is required, the adjustment procedure outlined above may be followed to simply and accurately adjust the shoe-to-drum clearance.

Although it may be obvious from the foregoing description, it is well to note at this point that the plate spring 68 frictionally bears against the leg 62 of member 60 so as to frictionally position the bearing 58. Thus each shift of bearing 58 will be stabilized by spring 68, and the shoes 14 and 16 will be virtually suspended vertically on backing plate 10 by means of the frictional force of spring 68.

Under some operating conditions of automotive vehicles, such vehicles are loaded to such an extent that the rear axle housing is slightly bent whereby the brake drum or drums may be distorted to such an extent that even though the brake mechanism is in released position, the rotating drum drags on the brake shoes. By reference to Figure 1, if drum 94 should distort or flatten toward the anchor assembly 48 and produce a dragging condition, the bearing 58 (and consequently the shoes) will move downwardly or radially inwardly away from the distorted portion of the drum. If the shoes were not thus allowed to move, such as when a fixed anchor is used, it is obvious that a dragging condition would interfere with satisfactory operation of the vehicle. By using the present invention, the possibility of dragging brakes due to drum distortion is obviated.

As a further feature of this invention, it will be noted that the extremities of arms 70 of the anchor assembly spring 68 are caused to bear against the shoe webs 20 and 24. By means of this engagement, the anchored ends of the shoes are located laterally with respect to the backing plate 10.

It should also be appreciated that since the return springs 82 exert forces on the shoes tending to move the anchored shoe ends radially outwardly of the brake mechanism, either one of said ends which may be spaced from the anchor 48, as during a brake application, will return to the anchor 48, during brake release, along a path which will first lead the lowest portion of the notches 76 into engagement with the rounded periphery of anchor 48. A close examination of the drawings (Figure 4) will show that this engagement will be of a sliding character of such nature that the concavity 76 will gradually straddle anchor 48 until the full, illustrated positioning engagement is obtained. With this arrangement, it is obvious that an objectionable audible click will not be produced as either of the anchored shoe ends returns to its portion of anchor 48, since the contact is sliding rather than impingement.

Also since springs 82 are connected between the shiftable member 60 and the two shoes, the resultant action will tend to maintain engagement of the shoe ends with bearing 58 and will not tend to urge either the bearing 58 or the shoes radially outwardly as would be the case where the common connection of said springs is fixed relative to the backing plate 10.

Although only one embodiment of the invention has been illustrated and described, various changes in the form and relative arrangements of the parts may be made to suit requirements.

I claim:

1. A brake mechanism for use in cooperation with a rotatable drum comprising a backing plate, a friction device mounted on said backing plate and comprising two circumferentially arranged T-section brake shoes each shoe having a rim and a web, one pair of adjacent shoe ends having an adjustable thrust connection therebetween, anchor means located between the other pair of adjacent shoe ends and comprising a post secured to said backing plate so as to project beyond the plane of the shoe webs, two opposite parallel flat surfaces provided on said post and lying in the plane of the shoe webs, said flat surfaces extending substantially radially of the brake mechanism and terminating in abutment shoulders, a stamped flat anchor bearing having a rectangular opening and a rounded outer periphery positioned on said post in such a manner that said flat surfaces are slidably engaged by respective longitudinal sides of said opening, said opening being of such length that said anchor bearing may slide on said surfaces radially of the brake mechanism, a rigid clamp of U-shaped cross section having one leg provided with a slot of substantially the same shape as said opening and being received on said flat surfaces so as to be slidable radially of the brake mechanism, said one leg lying against one face of said bearing and being movable therewith, a plate spring carried by the end of said post and engaging said one leg of said clamp in such a manner as to urge said clamp against said bearing and said bearing against the aforementioned abutment shoulders, the facing web ends of the other shoe ends having concave notches which conform to and are engageable with the outer periphery of said bearing whereby said other shoe ends will move radially of the brake mechanism with said anchor bearing, and two return springs, each having a connection with the other leg of said clamp and a respective one of the shoes whereby these latter mentioned shoe ends are urged into engagement with said bearing.

2. For use in cooperation with a rotatable drum, a brake mechanism comprising a backing plate, a full-wrapping friction device mounted on said backing plate and having adjacent expansible ends, anchor means carried by said backing plate at the top side thereof and arranged to provide vertical support for said friction device on said backing plate, said anchor means comprising a post carried by said backing plate, two parallel flat surfaces provided on said post and extending substantially parallel to a diameter of the brake mechanism, a flat anchor bearing received on said flat surfaces for limited movement radially of the brake mechanism, the ends of said friction device engaging the outer periphery of said bearing for movement therewith, a clamping member of U-shaped cross section having one leg engaging one side of said bearing for movement therewith, a head portion formed on the outer end of said post, a plate spring received by said head portion and arranged to exert a force on one said clamp leg to hold it against said bearing and also to retain said anchor means in assembly, said plate spring also engaging said expansible ends to position them laterally with respect to said backing plate, and two return springs urging said friction device into engagement with said bearing, each return spring having a connection with the other leg of said clamp and said friction device.

3. A brake mechanism for use in cooperation with a rotatable drum comprising a backing plate, a friction device mounted on said backing plate and comprising two circumferentially arranged T-section brake shoes, each shoe having a rim and a web, one pair of adjacent shoe ends having an adjustable thrust connection therebetween, anchor means located between the other pair of adjacent shoe ends and comprising a post secured to said backing plate, two opposite parallel flat surfaces provided on said post, said flat surfaces extending substantially radially of the brake mechanism and terminating in abutment shoulders, a stamped flat anchor bearing having a rectangular opening and positioned on said post in such a manner that said flat surfaces are slidably engaged by respective longitudinal sides of said opening, said opening being of such length that said anchor bearing may slide on said surfaces radially of the brake mechanism, a rigid clamp of U-shaped cross section having one leg provided with a slot of substantially the same shape as said opening and being received on said flat surfaces so as to be slidable radially of the brake mechanism, said one leg lying against one face of said bearing and being movable therewith, a plate spring carried by the end of said post and engaging said one leg of said clamp in such a manner as to urge said clamp and said bearing into assembly against the aforementioned abutment shoulders, the facing web ends of the other pair of shoe ends being engageable with the outer periphery of said bearing whereby said other shoe ends will move radially of the brake mechanism with said anchor bearing, and two return springs, each having a connection with the other leg of said clamp and a respective one of the shoes whereby these latter-mentioned shoe ends are urged into engagement with said bearings.

4. A brake mechanism for use in cooperation with a rotatable drum comprising a backing plate, a friction device mounted on said backing plate and comprising two circumferentially arranged T-section brake shoes, each shoe having a rim and a web, one pair of adjacent shoe ends having an adjustable thrust connection therebetween, anchor means located between the other pair of adjacent shoe ends and comprising a post secured to said backing plate, two opposite parallel flat surfaces provided on said post, said flat surfaces extending substantially radially of the brake mechanism and terminating in abutment shoulders, an anchor bearing having a rectangular opening and positioned on said post in such a manner that said flat surfaces are slidably engaged by respective longitudinal sides of said opening, said opening being of such length that said anchor bearing may slide on said surfaces radially of the brake mechanism, a rigid clamp of U-shaped cross section having one leg lying against one face of said bearing and being movable therewith, a plate spring carried by the end of said post and engaging said one leg of said clamp in such a manner as to urge said clamp and said bearing into assembly against the aforementioned abutment shoulders, the facing web ends of the other shoe ends being engageable with the outer periphery of said bearing whereby said other shoe ends will move radially of the brake mechanism with said anchor bearing, and two return springs each having a connection with the other leg of said clamp and a respective one of the shoes whereby these latter-mentioned shoe ends are urged into engagement with said bearings.

5. A brake mechanism for use in cooperation with a rotatable drum comprising a backing plate, a friction device mounted on said backing plate and comprising two circumferentially arranged T-section brake shoes, each shoe having a rim and a web, one pair of adjacent shoe ends having an adjustable thrust connection therebetween, anchor means located between the other pair of adjacent shoe ends and comprising a post secured to said backing plate, two opposite parallel flat surfaces provided on said post, said flat surfaces extending substantially radially of the brake mechanism and terminating in abutment shoulders, an anchor bearing having a rectangular opening and positioned on said post in such a manner that said flat surfaces are slidably engaged by respective longitudinal sides of said opening, said opening being of such length that said anchor bearing may slide on said surfaces radially of the brake mechanism, a rigid clamp of U-shaped cross section having one leg lying against one face of said bearing and being movable therewith, a plate spring carried by the end of said post and engaging said one leg of said clamp in such a manner as to urge said clamp and said bearing into assembly against the aforementioned abutment shoulders, the facing web ends of the other shoe ends being engageable with the outer periphery of said bearing whereby said other shoe ends will move radially of the brake mechanism with said anchor bearing, and two return springs, each having a connection with the other leg of said clamp, to urge these latter-mentioned shoe ends into engagement with said bearing.

6. A brake mechanism for use in cooperation with a rotatable drum comprising a supporting member, a friction device mounted on said supporting member and having adjacent expansible ends, anchor means located between said ends and comprising an anchor support which is carried by said supporting member, two opposite substantially parallel flat surfaces provided on said anchor support, said flat surfaces extending substantially radially of the brake mechanism and terminating in an abutment shoulder, a bearing element carried by said anchor support for sliding movement on said flat surfaces, a rigid clamp of U-shaped cross section having one leg engaging one portion of said element and being movable therewith, a resilient member carried by said support and arranged to urge said clamp and said element into assembly and against said abutment shoulder, said adjacent ends being engageable and movable with said element whereby the braking anchor load of said friction device will be transmitted through said element to said anchor support, and two return springs each having a connection with the other leg of said clamp, to yieldably urge these ends into engagement with said element.

7. A brake mechanism for use in cooperation with a rotatable drum comprising a supporting member, a friction device mounted on said supporting member and having adjacent expansible ends, anchor means located between said ends and comprising an anchor support which is carried by said supporting member, two opposite substantially parallel flat surfaces provided on said anchor support, said flat surfaces extending substantially radially of the brake mechanism, a bearing element carried by said anchor support for sliding movement on said flat surfaces, a rigid clamp of U-shaped cross section having one leg engaging one portion of said element and being movable therewith, a resilient member carried by said support and arranged to urge said clamp and said element into assembly, said adjacent ends being engageable and movable with said element whereby the braking anchor load of said friction device will be transmitted through said element to said anchor support, and two return springs, each having a connection with the other leg of said clamp, to yieldably urge these ends into engagement with said element.

8. A brake mechanism for use in cooperation with a rotatable drum comprising a supporting member, a friction device mounted on said supporting member and having adjacent expansible ends, anchor means located between said ends and comprising an anchor support which is carried by said supporting member, two opposite substantially parallel flat surfaces provided on said anchor support, said flat surfaces extending substantially radially of the brake mechanism, a bearing element carried by said anchor support for sliding movement on said flat surfaces, a rigid clamp of U-shaped cross section having one leg engaging one portion of said element and being movable therewith, a resilient member carried by said support and arranged to urge said clamp and said element into assembly, said adjacent ends being engageable and movable with said element whereby the braking anchor load of said friction device will be transmitted through said element to said anchor support, said resilient member also being arranged to engage said adjacent ends for urging them toward said supporting member, and two return springs, each having a connection with the other leg of said clamp, to yieldably urge these ends into engagement with said element.

9. For use in cooperation with a rotatable drum, a brake mechanism comprising a backing plate, a full-wrapping friction device mounted on said backing plate and having adjacent expansible ends, anchor means carried by said backing plate at the top side thereof and arranged to provide vertical support for said friction device on said backing plate, said anchor means comprising a post carried by said backing plate, two parallel flat surfaces provided on said post and extending substantially parallel to a diameter of the brake mechanism, a flat anchor bearing received on said flat surfaces for limited movement radially of the brake mechanism, the ends of said friction device engaging the outer periphery of said bearing for movement therewith, a connecting member arranged to move with said bearing and having a portion lying adjacent said bearing, a plate spring carried by said post and held thereby, a portion of said spring being loaded in the direction of the longitudinal axis of said anchor to exert a frictional force which tends to hold said bearing from sliding on said flat surfaces, said plate spring having two oppositely extending arms which engage the adjacent expansible ends of the friction device to prevent lateral movement thereof, and return spring means connected to said connecting member and said friction device for urging said adjacent ends into engagement with said bearing.

10. A brake mechanism for use in cooperation with a rotatable drum comprising a supporting member, a friction device mounted on said supporting member and having adjacent expansible ends, anchor means located between said ends and comprising an anchor support which is carried by said supporting member, two opposite substantially parallel flat surfaces provided on said anchor support, said flat surfaces extending substantially radially of the brake mechanism and terminating in an abutment shoulder, a bearing element of U-shaped cross section having one leg carried by said anchor support for sliding movement on said flat surfaces, a resilient member carried by said support and arranged to urge said element against said abutment shoulder, said adjacent ends being engageable and movable with said element whereby the braking anchor load of said friction device will be transmitted through said element to said anchor support, and return spring means connected to the other leg of said bearing element and said friction device in such a manner as to urge said adjacent ends into engagement with said bearing element.

11. For use in a brake mechanism, an anchor assembly comprising a post, said post including a plurality of axially spaced bosses, one of said bosses being of an approximately oblong form, a stamped substantially circular bearing member of harder material than said post and having a centrally located opening of approximately the same shape as said one boss for receiving said one boss in a manner permitting said bearing member to shift perpendicularly with respect to the axis of said post, said bearing member being positioned against a shoulder formed at the confluence of said one boss and an adjacent boss, a U-shaped member having one side with an opening similar to the one in said bearing member to receive said one boss, the other side of said U-shaped member being bifurcated, a tongue and groove connection between said bearing member and U-shaped member, a plate spring, the end of said post adjacent the U-shaped member being formed to engage said plate spring in a manner compressing said plate spring between the aforementioned post end and said U-shaped member to thereby urge the U-shaped member and bearing against said shoulder and tend to resist shifting of these latter two members with respect to the axis of the post.

12. In a brake mechanism including a backing plate, an anchor assembly comprising a post, said post including a plurality of axially spaced bosses, with one of said bosses being of approximately oblong shape, a U-shaped stamping having an opening in one side corresponding approximately in shape to said one boss for receiving said one boss in a manner permitting limited sliding movement of said stamping in a plane parallel to said backing plate, a plate spring, the end of said post adjacent the stamping being adapted to engage said spring to compress it against said stamping thereby tending to resist the limited shifting movement of the stamping with respect to the axis of said post.

13. In a brake mechanism, an anchor assembly comprising a post, said post including a plurality of axially spaced bosses with one of said bosses being of approximately oblong shape, a U-shaped stamping having one side substantially circular with an opening therethrough corresponding approximately in shape to said one boss for receiving said one boss in a manner permitting limited shifting movement of said stamping perpendicularly with respect to the axis of said post, the other side of said stamping being bifurcated, a plate spring, the end of said post adjacent said stamping being adapted to engage said spring for compressing it against said stamping to urge said one side against a shoulder formed at the confluence of said oblong boss and an adjacent boss, said spring thereby tending to prevent the limited shifting movement of said U-shaped stamping with respect to the axis of said post.

14. In a brake mechanism having a pair of arcuate T section shoes, an anchor assembly comprising a post, said post including a plurality of axially spaced bosses with one of said bosses being of approximately oblong shape, a U-shaped stamping having one side substantially circular and adapted to position said pair of brake shoes, said one side having an opening therethrough corresponding approximately in shape to said one boss for receiving said one boss in a manner permitting limited shifting movement of said stamping perpendicularly with respect to the axis of said post, the other side of said stamping being bifurcated, a plate spring, the end of said post adjacent said stamping being adapted to engage said spring for compressing it against said stamping to urge said one side against a shoulder formed at the confluence of said oblong boss and an adjacent boss, said spring thereby tending to prevent the limited shifting movement of said U-shaped stamping with respect to the axis of said post.

15. For use in cooperation with a rotatable drum, a brake mechanism comprising a backing plate, a full wrapping friction device mounted on said backing plate and having adjacent expansible ends, anchor means carried by said backing plate at the top side thereof and arranged to provide vertical support for said friction device on said backing plate, said anchor means comprising a post carried by said backing plate, two parallel flat surfaces provided on said post and extending substantially parallel to a diameter of the brake mechanism, a flat anchor bearing received on said flat surfaces for limited movement radially of the brake mechanism, the ends of said friction device engaging the outer periphery of said bearing for movement therewith, a connecting member arranged to move with said bearing and having a portion lying adjacent thereto, a plate spring carried by said post and held thereby, a portion of said spring being loaded in the direction of the longitudinal axis of said anchor to exert a frictional force which tends to hold said bearing from sliding on said flat surfaces, said plate spring having two oppositely extending arms which engage the adjacent expansible ends of the friction device to prevent lateral movement thereof, and two return springs, one end of each of the springs being secured to said member with the other ends of the springs being connected to the respective adjacent ends of said friction device so that said member and said friction device can shift together unopposed by said return springs.

16. For use in cooperation with a rotatable drum, a brake mechanism comprising a backing plate, a full wrapping friction device mounted on said backing plate and having adjacent expansible ends, anchor means carried by said backing plate at the top side thereof and arranged to provide vertical support for said friction device, said anchor means including a post carried by said backing plate, two parallel flat surfaces provided on said post and extending substantially parallel to a diameter of the brake mechanism, a flat anchor bearing received on said flat surfaces for limited movement radially of the brake mechanism, the expansible ends of said friction device engaging the outer periphery of said bearing for movement therewith, a plate spring carried by said post and held thereby, a portion of said spring being loaded in the direction of the longitudinal axis of said anchor to exert a frictional force which tends to hold said bearing from sliding on said flat surfaces, said plate spring having two oppositely extending arms which engage the adjacent expansible ends of the friction device to prevent lateral movement thereof, and resilient means which is arranged to urge the expansible ends of the friction device into engagement with said bearing, said bearing being in turn urged against the anchor to develop frictional force utilizable for suspending the friction device, said resilient means being movable with the ends of said friction device and bearing so that shiftable movement thereof is unopposed by said resilient means.

References Cited in the file of this patent

UNITED STATES PATENTS

| 2,139,345 | Babineau | Dec. 6, 1938 |
| 2,191,677 | Nickell | Feb. 27, 1940 |
| 2,202,842 | Dick | June 4, 1940 |
| 2,238,254 | Dick | Apr. 15, 1941 |
| 2,724,460 | Brooks | Nov. 22, 1955 |